US010366038B2

(12) United States Patent
Smith (10) Patent No.: US 10,366,038 B2
(45) Date of Patent: Jul. 30, 2019

(54) METHODS AND APPARATUSES FOR CONFIGURING A SERIAL INTERFACE

(71) Applicant: Cirrus Logic International Semiconductor Ltd., Edinburgh (GB)

(72) Inventor: Ian Johnson Smith, Rosewell (GB)

(73) Assignee: Cirrus Logic, Inc., Austin, TX (US)

( * ) Notice: Subject to any disclaimer, the term of this patent is extended or adjusted under 35 U.S.C. 154(b) by 233 days.

(21) Appl. No.: 15/341,754

(22) Filed: Nov. 2, 2016

(65) Prior Publication Data

US 2017/0132170 A1    May 11, 2017

Related U.S. Application Data

(60) Provisional application No. 62/251,321, filed on Nov. 5, 2015.

(30) Foreign Application Priority Data

Feb. 2, 2016    (GB) .................................... 1601859.0

(51) Int. Cl.
| | |
|---|---|
| H04R 5/04 | (2006.01) |
| G06F 13/42 | (2006.01) |
| G06F 3/16 | (2006.01) |
| G06F 13/36 | (2006.01) |
| G06F 13/40 | (2006.01) |

(52) U.S. Cl.
CPC .......... *G06F 13/4282* (2013.01); *G06F 3/162* (2013.01); *G06F 13/36* (2013.01); *G06F 13/4068* (2013.01); *Y02D 10/14* (2018.01); *Y02D 10/151* (2018.01)

(58) Field of Classification Search
None
See application file for complete search history.

(56) References Cited

U.S. PATENT DOCUMENTS

2003/0194066 A1* 10/2003 Caldera ................ H04L 12/66
                                                        379/93.08
2005/0268000 A1    12/2005 Carlson
                        (Continued)

FOREIGN PATENT DOCUMENTS

EP    0836361 A2    4/1998

OTHER PUBLICATIONS

Combined Search and Examination Report under Sections 17 and 18(3), Application No. GB1601859.0, dated Jul. 7, 2016, 9 pages.

*Primary Examiner* — Hyun Nam
(74) *Attorney, Agent, or Firm* — Jackson Walker L.L.P.

(57) ABSTRACT

This application relates to methods and apparatus for configuring a serial data interface, especially a data interface (300) for a transducer (324) such as a digital microphone or loudspeaker. The data interface is selectively operable in a first or second serial data mode of operation for input of data to or output data from the transducer device. The first and second serial data modes are different, e.g. correspond to different serial formats. The data interface has a controller (330) configured to determine a resistance value (331, 332) at a sense terminal (314) of the transducer device and to control the data interface in the first serial data mode if the resistance value is within a first resistance range and control the data interface in the second serial data mode if the resistance value is within a second, different, resistance range.

23 Claims, 7 Drawing Sheets

(56) References Cited

U.S. PATENT DOCUMENTS

| | | |
|---|---|---|
| 2009/0108854 A1 | 4/2009 | Agevik et al. |
| 2009/0179768 A1 | 7/2009 | Sander et al. |
| 2009/0180639 A1 | 7/2009 | Dai et al. |
| 2012/0110218 A1 | 5/2012 | Josefsson et al. |
| 2013/0020882 A1* | 1/2013 | Prentice .............. H04R 29/004 307/116 |
| 2014/0073188 A1 | 3/2014 | Fritchman et al. |
| 2014/0321664 A1 | 10/2014 | Huang et al. |
| 2014/0376736 A1* | 12/2014 | Liu .................... H04R 1/1041 381/74 |
| 2015/0296291 A1* | 10/2015 | Macours ............. H04R 1/1041 381/74 |

* cited by examiner

METHODS AND APPARATUSES FOR CONFIGURING A SERIAL INTERFACE

FIELD

The field of representative embodiments of this disclosure relates to methods, apparatuses, and implementations concerning or relating to configuring serial data interfaces for transducers. Applications include, but are not limited to, serial interface digital audio transducer devices capable of operating with more than one serial interface format and according to respectively defined identities in apparatuses or systems comprising multiple such audio transducer devices.

BACKGROUND

Mobile computing devices, for example cellphones, tablets, laptops of various mechanical configurations and similar electronic user apparatus comprise audio transducers, including but not limited to microphones or loudspeakers for communicating, recording, playing back or otherwise processing audio signals such as voice or music. Increasingly, such apparatus may comprise multiple microphones or speakers to allow more complex audio signal processing, which may be implemented on a device such as a smart codec or other integrated circuitry comprising digital signal processing capability.

Figure 1:
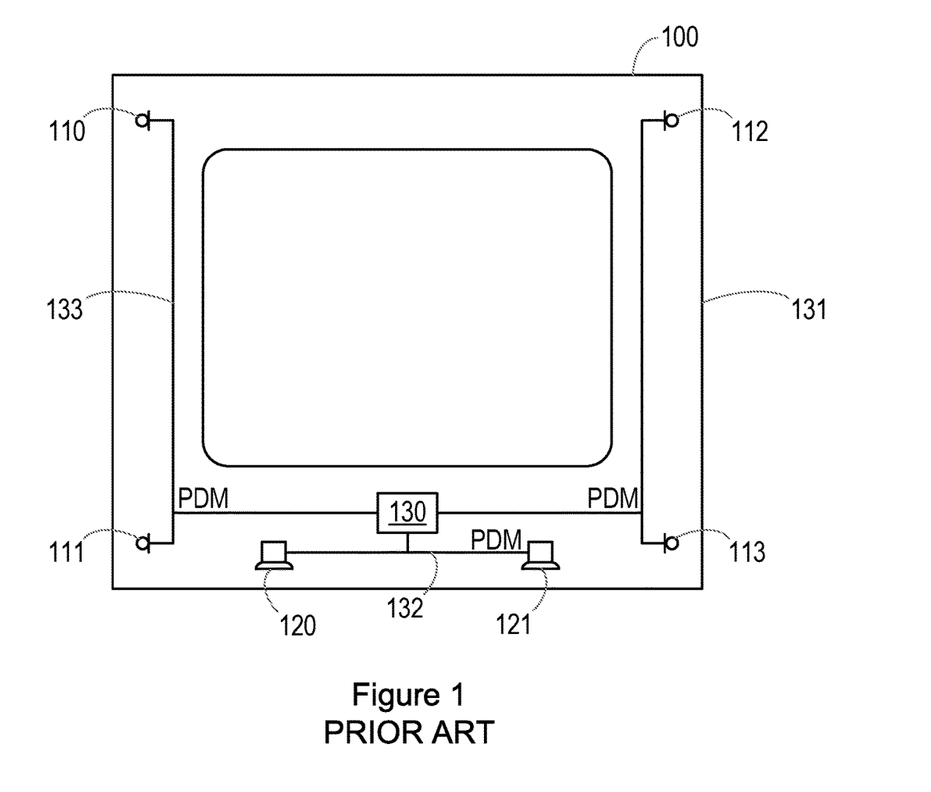
FIG. 1 illustrates a conventional apparatus with audio transducers connected with multiple PDM buses.
Figure 2A:
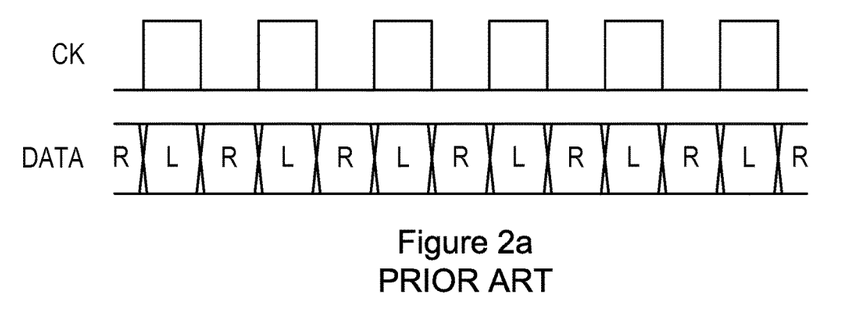
FIGS. 2a and 2b illustrate known PDM formats for two left and right microphone data and a multiple channel data format respectively.

By way of example in accordance with the prior art, FIG. 1 illustrates a cellphone 100 comprising six audio transducer devices: four digital microphones 110, 111, 112, 113 and two digital loudspeakers 120, 121. Each of these transducer devices needs to receive or transmit streams of audio data from or to a smart codec 130. The microphones in particular are very small, of the order of 1 mm on a side, so can only accommodate a very limited number of electrical terminals or pins. The codec and the digital loudspeaker may also have a limited number of pins. Thus, the audio data may be transmitted by serial buses carrying the required clock and data information on only one or two lines, e.g. wires. One example of such a serial interface is the commonplace multiplexed pulse-density-modulated (PDM) format, where a "left" microphone and a "right" microphone transmit pulse-density-modulated (PDM) or delta-sigma over-sampled data streams in alternate half-cycles of a clock as illustrated in prior art FIG. 2a. This format allows two channels of audio data to share a single bus of two wires (one carrying clock to the microphone, one carrying the multiplexed data back from the microphones in a time-multiplexed fashion). Data can be transmitted to pairs of loudspeaker devices in a similar fashion. Thus cellphone 100 comprises three TDM audio buses 131, 132, 133 as illustrated in FIG. 1.

Rather than separately manufacture "left" (L) and "right" (R) channel microphones, designed to output respective PDM audio data in first or second clock half-cycles, digital microphones conventionally comprise one further pin, and are configured to output data bits in the first half clock cycle if this pin is tied to a logic high voltage, typically the microphone positive supply voltage, and to output data bits in the second half clock cycle if this pin is tied to a logic low voltage, typically ground. In other words, the same digital microphone may contribute either the L or R components of the composite DATA waveform shown in FIG. 2a.

Figure 2B:
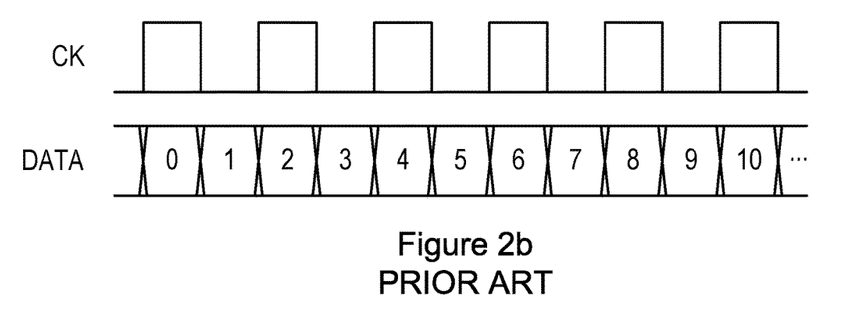

However, such an interface format only allows two audio data channels to share a bus, and (except possibly for test modes) only to carry data in one direction. There are other more complex serial data interface formats, for example Soundwire™ interface format, which allow multiple channels of audio data, say up to 16 channels, in either direction, and also to convey control data in both directions. Such formats may contain framing information, but during the periods when transmitting payload data, the waveforms on the bus may similarly comprise half-clock-period durations in which each device on the bus may send data in turn, as illustrated in prior art FIG. 2b.

In some applications, the simpler scheme is more appropriate, for example for cheaper and less flexible systems, whereas in more feature-rich applications, the more flexible but more complex bus and related interface circuitry is appropriate. Also, similar models of device may have less or more functionality.

Rather than having separate models of microphone device for respective different buses, it is advantageous to have a device designed so as to be capable of accommodating operation in either mode. Thus, only the one device needs to be qualified for production of the end-user apparatus, even for different models. Also, as models evolve, for example suitable Soundwire codec circuits become commercially available to replace the incumbent PDM codec, the Soundwire codec can be adopted without having to re-engineer the acoustics or re-qualify the system as would be required if a different model of microphone were required.

However, to be able to operate in either mode requires such a device to be able to recognize what sort of interface it is connected to. Attempts to decode this from the present bit patterns on the two wires have proven not be to adequately reliable. It is undesirable to add another pin onto the digital microphone as this would either increase the size of the microphone device package or reduce the dimensions of each pin or pad below that desirable for reliable connection onto the underlying circuit board.

For buses, such as Soundwire, which carry more than two channels of information, each device attached to the bus requires an address or similar identity information. If there are more than two devices attached to each bus, then the simple "left/right" pin strapping technique above can no longer identify each device. Especially for microphones, it is undesirable to have multiple identity pins each tied high or low to define the binary address.

Thus, there is a desire for a low pin-count method of identifying a device in an end-user apparatus and to define whether the device is to communicate via say a PDM format or some other format such as Soundwire.

Similarly, digital loudspeaker devices also require the ability to select an interface format and indicate the device's identity to the bus.

Example Embodiments of the Present Disclosure

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

According to one aspect there is provided data interface for a transducer device, the data interface being selectively operable in a first serial data mode of operation or a second, different, serial data mode of operation for input of data to or output data from the transducer device, the data interface comprising a controller configured to determine a resistance value at a sense terminal of a transducer device and control the data interface in the first serial data mode if the resistance value is within a first resistance range and control the data interface in the second serial data mode if the resistance value is within a second, different, resistance range.

The controller may be further configured to determine a characteristic of the voltage at the sense terminal. The characteristic of the voltage may be the polarity of the voltage. Additionally or alternative a characteristic of the voltage may be whether the voltage corresponds to a high voltage or a low voltage. The low voltage may be ground. The controller may configure operation of the data interface in the first mode based on the detected voltage characteristic. The controller may configure the timing of data read or data write with respect to a clock signal based on the detected voltage characteristic. Additionally or alternatively the controller may configure operation of the data interface in the second mode based on the detected voltage characteristic.

In some embodiments, in the event that the resistance value is within the second resistance range the controller is configured to determine which of a plurality of sub-ranges the resistance value falls within and controller to configure operation of data interface in said second mode based on the determined sub-range. The controller may be configured to determine an identifier or address for the transducer based on the determined sub-range and/or the voltage characteristic. The controller May be configured to determine a time slot for data read or data write with respect to a frame period based on the determined sub-range and/or the voltage characteristic.

The data interface may comprise a first interface circuit configured to operate in said first serial data mode and a second interface circuit configured to operate in said second serial data mode. The controller may comprise a detection circuit for monitoring the current and/or voltage at the sense terminal as a plurality of current and/or voltage sources are selectively connected to the sense terminal.

The first serial data mode may be a pulse-density-modulation serial data mode. The second serial data mode may be a serial data mode capable of transmitting more than two channels of data. The second serial data mode may be a Soundwire serial data mode.

The data interface may be configured to input or output data from or to a first serial interface terminal and to receive a clock signal at a second serial interface terminal.

Embodiments also relate to a transducer comprising a data interface of any of the variants described above. The transducer may be at least one of: a microphone and a loudspeaker. Embodiments also relate to an electronic apparatus comprising such a transducer.

Embodiments also relate to a method of determining and operating in a serial interface format mode of a serial data interface for a transducer device to operate wherein the transducer device comprises two serial interface pins and a sense pin, comprising:
  detecting from the sense pin a resistance value;
  determining whether the resistance value is in a first range or a second range of resistances;
  in response to the resistance value being in the first range, operating the serial data interface in a first mode of the serial interface format mode; and
  in response to the resistance value being in the second range, operating the serial data interface in a second mode of the serial interface format mode.

Embodiments also relate to a method of configuring a serial data interface for a transducer device comprising two serial interface pins and a sense pin, said method comprising:
  detecting the polarity of voltage applied to a first terminal of a resistance whose other terminal is connected to said sense pin;
  determining whether the value of said resistance is in a first range or second range of resistance; and
  if the value of said resistor is in said first range, operating the interface in a first mode receiving a clock on a first interface pin and receiving or transmitting data bits on a second interface pin, with data bits received or transmitted during a first half clock cycle or a second half clock cycle of the applied clock according to the detected polarity of voltage; and
  if the value of resistance is in said second range of resistance operating the interface in a second mode, and transmitting an address identifier via said interface based on to the detected polarity of voltage.

The first range of resistance may lie below a first threshold resistance value and the second range of resistance may lie above the first threshold value. The first range of resistance may comprise a value of zero ohms. If the value of resistance is in a second range of resistance, above said first threshold, the method may comprise transmitting the address identifier via said interface based on the detected polarity of voltage and further based on which of a plurality of sub-ranges of resistance the detected resistance lies. The first mode may be a multiplexed pulse-density-modulation (PDM) mode. The second mode may be a Soundwire mode. The transducer device may be a MEMS microphone or a digital loudspeaker.

Embodiments also relate to a transducer device comprising two serial data interface circuits further comprising circuitry for determining which of said two serial data interface circuits to activate on the basis of a determination of the value and connectivity of a resistance connected a sense and further communicating on the activated bus in timeslots determined on the basis of the on the said value and connectivity of a resistance.

Embodiments also relate to a transducer device comprising two serial interface pins and a sense pin, configured to: detect the polarity of voltage applied to a first terminal of a resistance whose other terminal is connected to said sense pin; determine whether the value of said resistance is in a first range or second range of resistance; and if the value of said resistor is in said first range, operate the interface in a first mode receiving a clock on a first interface pin and receiving or transmitting data bits on a second interface pin, with data bits received or transmitted during a first half clock cycle or a second half clock cycle of the applied clock according to the detected polarity of voltage; and if the value of resistance is in said second range of resistance operate the interface in a second mode, and transmitting an address identifier via said interface based on to the detected polarity of voltage.

Embodiments also relate to a mobile computing device or a headset comprising at least one transducer device as described in any of variants above.

BRIEF DESCRIPTION OF THE DRAWINGS

Embodiments of the invention will now be described, by way of example only, with reference to the accompanying drawings, of which.

DETAILED DESCRIPTION

The disclosure relates to a method of configuring a serial data interface for a transducer device and/or a configurable serial data interface for a transducer device. The data interface may comprise two serial interface pins and a sense pin. In some embodiments the method comprises: detecting the polarity of voltage applied to a first terminal of a resistance whose other terminal is connected to said sense pin; determining whether the value of said resistance is in a first range or second range of resistance. If the value of said resistor is in said first range, the method may involving operating the interface in a first mode or format, which may involve receiving a clock on a first interface pin and receiving or transmitting data bits on a second interface pin, with data bits received or transmitted during a first half clock cycle or a second half clock cycle of the applied clock according to the detected polarity of voltage. If the value of resistance is in said second range of resistance the method may involve operating the interface in a second mode or format, and transmitting an address identifier via said interface based on the detected polarity of voltage.

The first range of resistance may lie below a first threshold resistance value and said second range of resistance may lie above the first threshold value. The first range of resistance may comprise a value of zero ohms.

The second range of resistance value may comprise sub-ranges, to allow more device addresses to be defined. Thus, if the determined value of resistance is in a second range of resistance, above said first threshold, the transmitted address identifier may be based at least partly on which of a plurality of subranges of resistance that the detected resistance lies within.

The circuitry required to perform the resistance value and connection polarity information may be continuously active in use, or may be controlled to activate only when required to initialize the circuitry, for example on device power-up, and to deactivate once the resistance parameters have been determined.

The first mode may be a multiplexed PDM mode; the second mode may be a Soundwire mode. The first and second serial data modes may thus correspond to different serial data formats.

The transducer device may be an acousto-electrical transducer device, for example a MEMS microphone package, comprising an acousto-electrical transducer element, for example a microelectromechanical systems (MEMS) transducer element, which may be capacitive or piezo-electric or piezo-resistive or acousto-optical.

The transducer device may be an electro-acoustical transducer device, for example a digital loudspeaker device, i.e. incorporating an electro-acoustical transducer device, for example a microspeaker or moving coil transducer or piezo-electric transducer element.

Whether acousto-electrical or electro-acoustical, the transducer may be designed to handle signals primarily within the human audible range (e.g. 20 Hz to 20 kHz) or may handle ultrasonic signals or may handle sub-audio signals, e.g. vibrations or haptic signals.

In embodiments the data interface is the interface for the transducer itself, i.e. the interface by which the transducer communicates with other components. The data interface may therefore be formed as part a package with the transducer. For instance the transducer may be part of a digital microphone package as may be used as a microphone component within a host device or accessory device. The data interface is packaged with the transducer and may, in some instances by integrated with circuitry for operating the transducer, and the data interface may thus be at least one interface for the packaged microphone to communicate with other components. For instance in some example the data interface of the transducer may be arranged, in use, for data transfer with an audio circuit such as a codec or audio DSP of an electronic device.

The methods and apparatus described may be applicable for use in a mobile computing device, for example a cellphone or tablet computer or other portable computing device. The methods and apparatuses described may also be applicable for use in headsets or headphones, particularly ambient noise cancellation headsets comprising multiple microphones.

The embodiments thus provide apparatuses and methods for providing a microphone device capable of operating in at least two bus formats (e.g. PDM or Soundwire) and for identifying each of two or more devices attached to the bus, without requiring extra pins or adding complexity and risk to an initialization protocol.

Figure 3A:
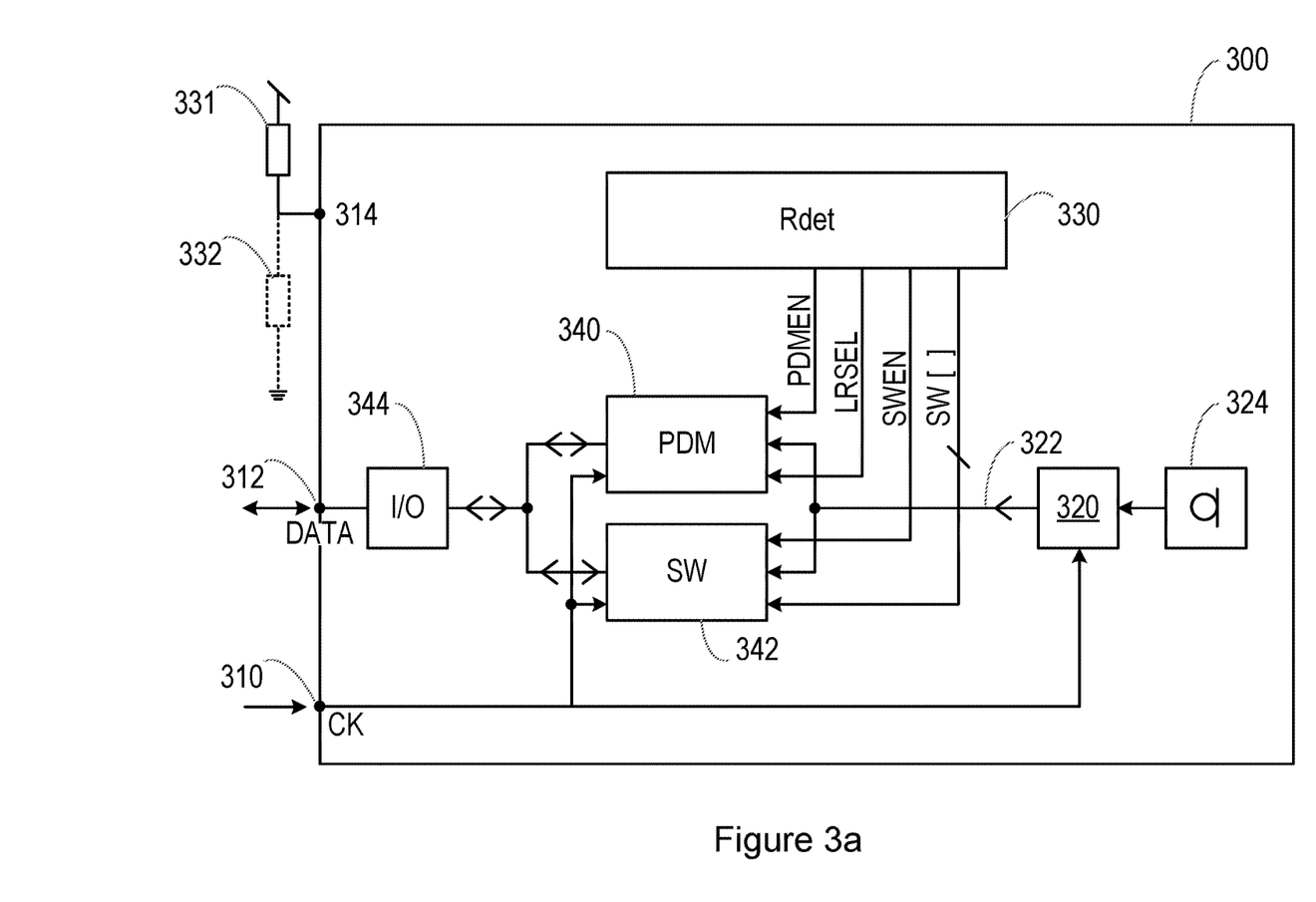
FIG. 3a illustrates an apparatus according to an embodiment and FIG. 3b illustrates a range of resistances.

FIG. 3a illustrates one embodiment 300 of a microphone device according to aspects of this disclosure. Microphone device 300 is configured to accept a clock CK at clock pin 310 which is used to derive a clock for digitization circuitry 320 which generates a bit-stream of oversampled data 322 from the electrical signal generated by a microphone transducer element 324 (for example a MEMS capacitive microphone transducer element).

Microphone device 300 comprises a first interface circuit, e.g. a PDM interface circuitry 340, which when enabled can accept the oversampled data 322 from the microphone digitization circuitry and transmit it via a DATA pin 312 possibly also via pad input/output buffer 344. Microphone device 300 also comprises a second interface circuit, e.g. a Soundwire interface circuitry 342, which when enabled can accept the oversampled data 322 from the microphone digitization circuitry and transmit it via the DATA pin 312.

Microphone device 300 also comprises a resistance detection circuit 330 which monitors the value of any resistance that may be attached to a sense or ID pin 314 of the device, and also detects the polarity of voltage to which the other terminal of any such resistance is connected to: for example whether such resistance is connected to the supply voltage for the microphone device as illustrated by resistor 331 or ground as illustrated by resistor 332. The detection circuit 330 thus determines a voltage characteristic of the sense or ID pin or terminal 314 and a resistance value for a connected resistance.

If pin 314 is essentially shorted to ground or supply, i.e. if the resistance is determined to be in a first range of resistance between zero and some nominal threshold, say 1 kohm, then detection circuit 330 sends a control signal PDMEN to activate the PDM interface and keeps the Soundwire (SW) interface disabled. Detection circuitry 330 also sends a control signal LRSEL to the PDM interface such that if the short is to ground, then data is transmitted during the clock half-cycle following a rising edge (say) and conversely if the short is to supply, then the data is transmitted in the other half cycle. In each case, the output is rendered high-impedance in the unused half-clock-cycle to allow the data from another microphone, if present, to be carried during that time.

However, if resistance detection circuit 330 determines that the value of resistance does not lie in the first range of resistance, but in a higher range of resistance, say between 3 kohms and 1 Mohm, then the PDM interface is kept disabled and the Soundwire (SW) interface is enabled by control signal SWEN.

Figure 3B:
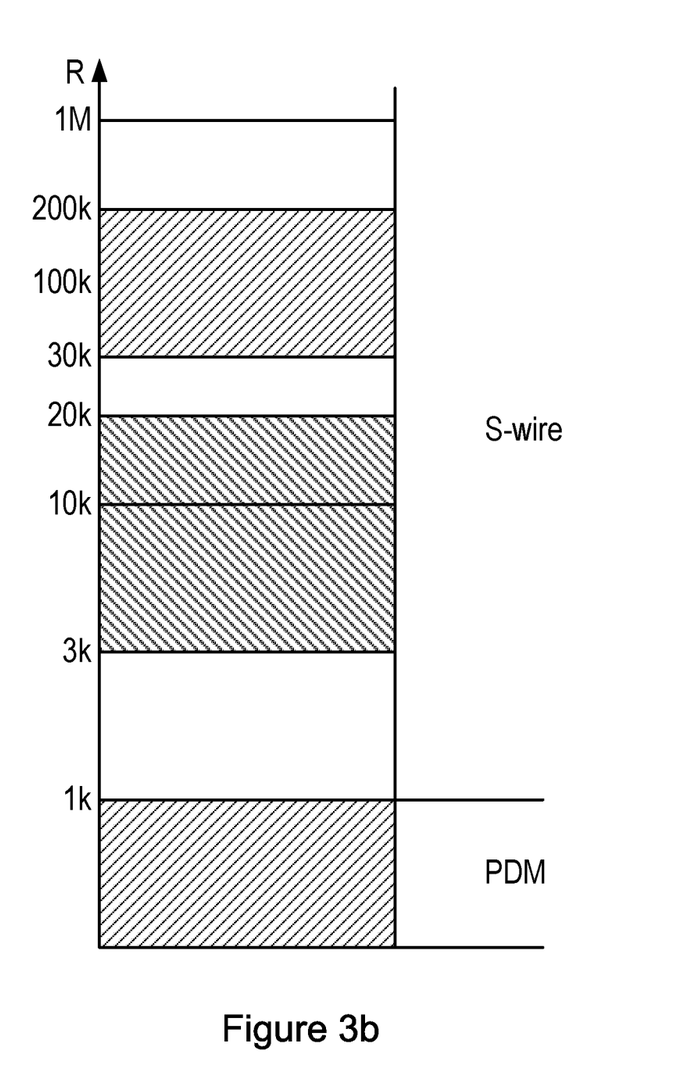

The Soundwire interface allows up to 16 devices to carry data in a time-multiplexed fashion in bit slots that are defined in a frame structure that is defined by a host device during an initialization procedure. Each device on the bus is required to transmit an address identifier, and this address identifier defines which bit slot it is to transmit (and/or receive) data. The resistance detection circuit 330 provides this address information, or signals from which this address is derived within the Soundwire interface circuitry. This address may be determined at least partly by the polarity of voltage applied to the resistor attached to the ID pin 314. This address may be determined at least partly by the value of the resistance, i.e. which of several sub-ranges of resistance value it falls. For example ranges comprising the value 10 kohm or 100 kohm, i.e. a first sub-range spanning from 3 kohm to 20 kohm or a second sub-range spanning from 30 kohm to 200 kohm, as illustrated in FIG. 3b. For example, the address, or suitable data from which to derive the full address may be communicated to the Soundwire interface by signal SW[0:3].

To guard against the event in which there is no resistor attached to the sense or ID pin 314, the resistance detection circuitry may also detect if the apparent resistance of the pin is more than some maximum threshold value, say 1 Mohm, in which case the device may either not activate either interface or activate some default mode.

PDM and Soundwire interfaces are well known so will not be detailed here.

Figure 4:
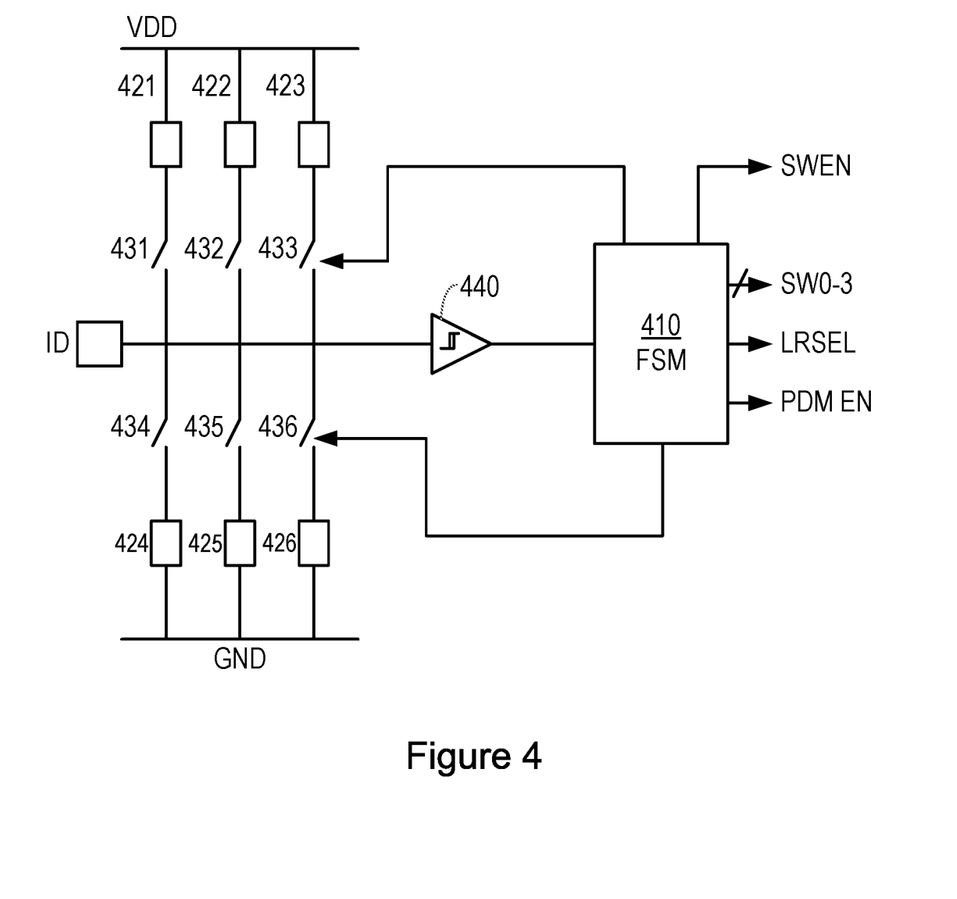
FIG. 4 illustrates one example for measuring resistance.

There are many possible circuits for measuring the value and connection polarity of a resistance attached to an integrated circuit pin. FIG. 4 illustrates one implementation. In operation, finite state machine (FSM) 410 cycles the connection of combinations of one or more on-chip resistors 421 to 426 via respective switches 431 to 436 to superimpose their effect onto the pull-up or pull-down resistance attached externally. For each combination, the resulting voltage on the ID 314 is monitored by a comparator (or Schmitt trigger 440 as illustrated), and the state machine 410 then iterates the connections by a suitable algorithm until the range of external connected resistance may be deduced. The state machine then outputs appropriate logic levels on outputs PDMEN to enable the PDM interface, LRSEL to select which half-cycle the PDM interface transmits data on, SWEN to enable or disable the Soundwire (SW) interface, and SW[0:3] to flag to the Soundwire (SW) interface which of four bus addresses to use (or possibly to directly indicate the full address).

Other implementations will be apparent to those knowledgeable in the field, for example methods incorporating switch current sources rather than resistors, ramped positive and negative current sources with one or more comparators, multiple comparators in parallel or a single multiplexed comparator, switched-capacitor summing circuitry to ratiometrically define signal thresholds and many other variations and combinations.

In some embodiments, the resistance detection circuitry may be active continuously. In other embodiments, the resistance detection circuitry may be active only for a short period on start-up or power-on reset, or other system reset. Once the resistance is determined and the appropriate control signal are generated, at least most of the resistance detection circuitry may be powered-down. This will avoid the continuous power consumption of this circuitry.

Figure 5:
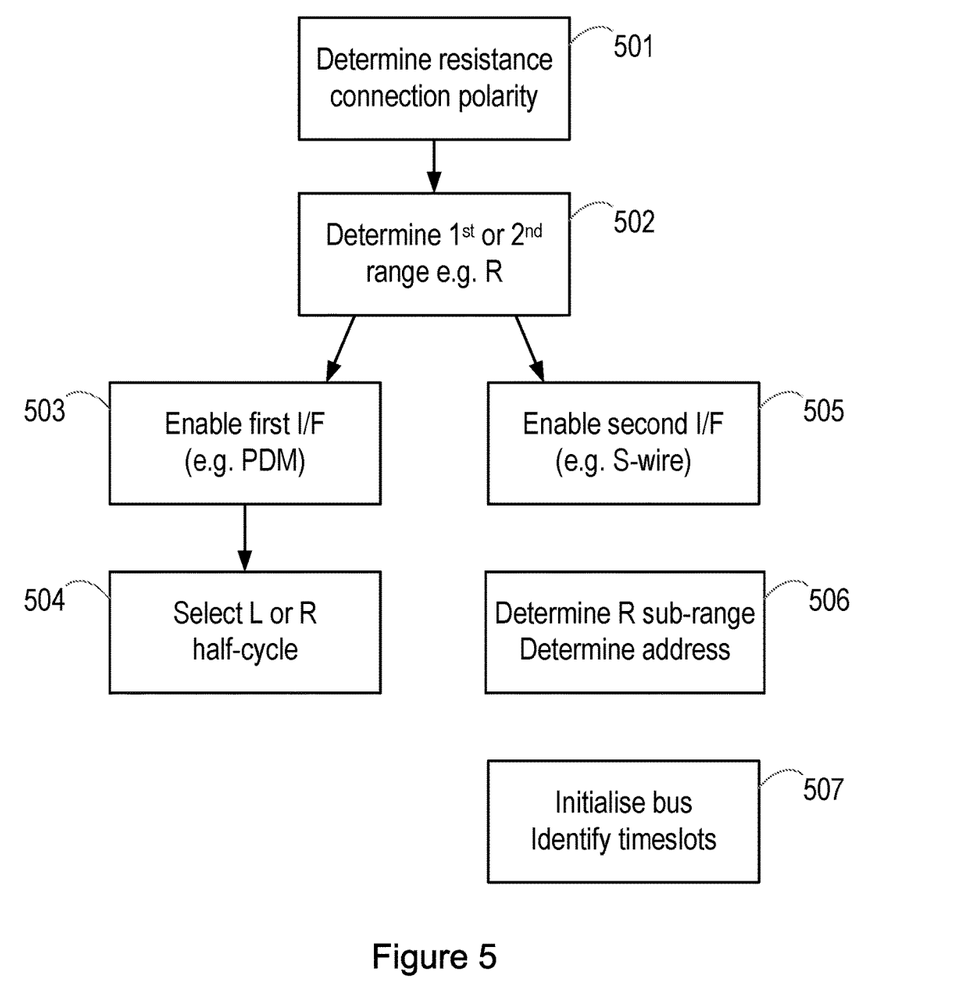
FIG. 5 illustrates a flow-chart of a method according to an embodiment.

FIG. 5 illustrates the steps involved in configuring the microphone device illustrated above or other similar apparatus.

In a first step 501, the polarity of voltage applied to a first terminal of a resistance whose other terminal is connected to said sense pin is determined, for example simply by whether the pin floats high or low when not driven, or by the direction of current if tied to mid-rail.

In a second step 502, the value of said resistance is determined to be in a first range or second range of resistance; depending on the range, the method then proceeds to step 503 or 505 respectively.

In a step 503, the value of said resistor is in said first range, so the serial interface is set to operate the interface in a first mode, which may for example be a PDM mode which involves receiving a clock on a first interface pin and receiving or transmitting data bits on a second interface pin.

In a step 504, the selected serial interface may be configured to receive or transmit data bits during a first half clock cycle or a second half clock cycle of the applied clock according to the previously detected polarity of voltage. The serial interface then remains in this state until an event such as a power-down occurs.

In step 505, the value of resistance is in said second range of resistance so the serial interface is set to operate a second mode (for example Soundwire).

In step 506, the resistance detect circuitry generates address-related data based on the polarity and/or resistance value information, In step 507, the second interface receives this address-related information with which it may communicate to the master on the bus during initialization to identify to which timeslots it is to transmit or expect data on or to which address it is to react to any data presented from elsewhere on the bus.

Note that in some embodiments the order of the steps may differ somewhat from the above.

While the embodiment illustrated in FIG. 3 relates to a digital microphone, the method and component blocks described may also be applicable to other transducers, for example digital loudspeaker devices. Digital loudspeaker devices may incorporate serial data interface circuitry accepting digital audio data for reproduction in PDM or Soundwire formats, and may comprise conversion circuitry and Class AB or Class D or other driver amplifiers as well as a loudspeaker electroacoustic output transducer, either co-packaged or in separate components.

Also while the embodiment illustrated in FIG. 3 relates to a digital microphone and audio data, it should be understood that the methods and component blocks described may also be applicable with appropriate adaptation if required for streams of data representing signals of spectrum either above the human audible range (e.g. ultrasonic signals) or below normal audio signals e.g. vibration or haptic input or output transducers.

Figure 6:
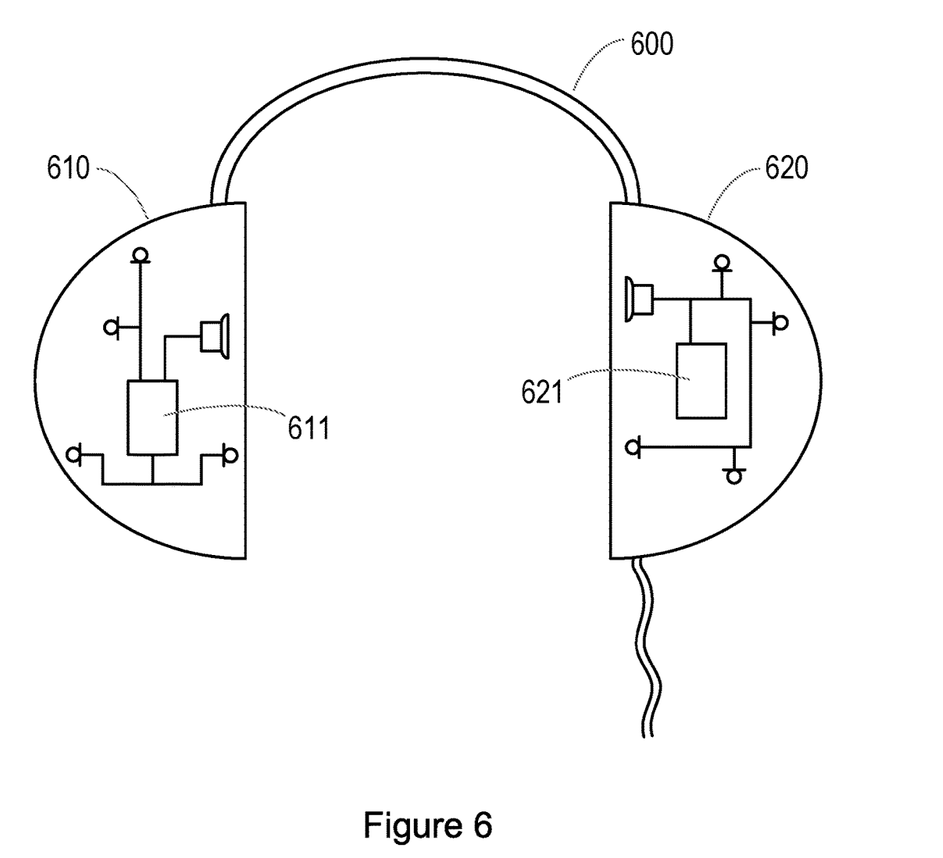
FIG. 6 illustrates an example of a headset according to an embodiment.

The methods and apparatus above may be used in a mobile computing device similar to the cellphone illustrated in FIG. 1. The methods and apparatus above may also be applicable to headsets (including headphone or earbud arrangements) incorporating noise cancellation circuitry. FIG. 6 illustrates a noise cancelling headphone 600 in which each headphone cap 610, 620 comprises four digital microphones in addition to a loudspeaker. These microphones may be connected to the noise cancellation signal processing circuitry 611 by two buses as illustrated within cap 610. If the noise cancellation circuitry were to evolve to incorporate Soundwire functionality, the headset apparatus could be readily modified to accommodate this functionality, preferably with a single Soundwire bus instead of the two PDM buses, as illustrated in the right hand cap 620, while still using the identical designs of microphone, thus avoiding all the re-characterization of the acoustic paths and impedances and consequent refinement of the noise cancellation processing parameters that would be required if a different microphone model were to be used.

In further embodiments, rather than being situated in a headphone cap, the noise cancellation circuitry may be in a dongle attached to the headset cabling, connected via a serial interface bus as described above.

It should be understood—especially by those having ordinary skill in the art with the benefit of this disclosure—that that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein.

The invention claimed is:

1. A method of configuring a serial data interface for a transducer device comprising two serial interface pins and a sense pin, said method comprising:
   detecting the polarity of voltage applied to a first terminal of a resistance whose other terminal is connected to said sense pin;
   determining whether the value of said resistance is in a first range or second range of resistance; and
   if the value of said resistance is in said first range, operating the interface in a first mode receiving a clock on a first interface pin and receiving or transmitting data bits on a second interface pin, with data bits received or transmitted during a first half clock cycle or a second half clock cycle of the applied clock according to the detected polarity of voltage; and
   if the value of said resistance is in said second range of resistance operating the interface in a second mode, and transmitting an address identifier via said interface based on to the detected polarity of voltage.

2. A transducer device comprising two serial interface pins and a sense pin, configured to:
   detect the polarity of voltage applied to a first terminal of a resistance whose other terminal is connected to said sense pin;
   determine whether the value of said resistance is in a first range or second range of resistance; and
   if the value of said resistance is in said first range, operate the interface in a first mode receiving a clock on a first interface pin and receiving or transmitting data bits on a second interface pin, with data bits received or transmitted during a first half clock cycle or a second half clock cycle of the applied clock according to the detected polarity of voltage; and
   if the value of said resistance is in said second range of resistance operate the interface in a second mode, and transmitting an address identifier via said interface based on to the detected polarity of voltage.

3. The method of claim 1 wherein said first range of resistance lies below a first threshold resistance value and said second range of resistance lies above said first threshold value.

4. The method of claim 1 wherein said first range of resistance comprises a value of zero ohms.

5. The method of claim 1 wherein if the value of resistance is in the second range of resistance above said first threshold the method comprises transmitting the address identifier via said interface based on the detected polarity of voltage and further based on which of a plurality of sub-ranges of resistance the detected resistance lies.

6. The method of claim 1 wherein if the value of resistance is in the second range of resistance the method comprises determining a time slot for data read or data write with respect to a frame period based on the determined sub-range and/or the detected polarity of voltage.

7. The method of claim 1 wherein said first mode is a multiplexed pulse-density-modulation (PDM) mode.

8. The method of claim 1 wherein said second mode is a Soundwire mode.

9. The method of claim 1 wherein said transducer device is a MEMS microphone.

10. The method of claim 1 wherein said transducer device is a digital loudspeaker.

11. A transducer device as claimed in claim 2 comprising a controller, wherein, in the event that the value of said resistance is within the second range of resistance, the controller is configured to determine which of a plurality of sub-ranges the value of resistance falls within and to configure operation of data interface in said second mode based on the determined sub-range.

12. A transducer device as claimed in claim 11 wherein the controller is configured to determine an identifier or address for the transducer based on the determined sub-range and the detected polarity of voltage.

13. A transducer device as claimed in claim 2 wherein the controller is configured to determine a time slot for data read or data write with respect to a frame period based on the determined sub-range and/or the detected polarity of voltage.

14. A transducer device as claimed in claim 2 comprising a first interface circuit configured to operate in said first mode and a second interface circuit configured to operate in said second mode.

15. A transducer device as claimed in claim 2 comprising a detection circuit for monitoring the current and/or voltage at the sense pin as a plurality of current and/or voltage sources are selectively connected to the sense pin.

16. A transducer device as claimed in claim 2 wherein said first mode is a pulse-density-modulation serial data mode.

17. A transducer device as claimed in claim 2 wherein said second mode is a serial data mode capable of transmitting more than two channels of data or a Soundwire serial data mode.

18. A transducer device as claimed in claim 2 wherein the transducer device is configured to input or output data from or to a first serial interface terminal and to receive a clock signal at a second serial interface terminal.

19. A transducer device claimed in claim 2 comprising a transducer wherein the transducer is at least one of: a microphone and a loudspeaker.

20. The method of claim 2 wherein said first mode is a multiplexed pulse-density-modulation (PDM) mode.

21. The method of claim 2 wherein said second mode is a Soundwire mode.

22. The method of claim 2 wherein said transducer device is a MEMS microphone.

23. The method of claim 2 wherein said transducer device is a digital loudspeaker.

* * * * *